United States Patent
Grzegorzewska et al.

(10) Patent No.: US 6,913,392 B2
(45) Date of Patent: Jul. 5, 2005

(54) ROTATIONALLY ADJUSTABLE FIBER OPTIC CONNECTOR

(75) Inventors: Barbara Grzegorzewska, Chicago, IL (US); Igor Grois, Northbrook, IL (US); Yuriy Belenkiy, Niles, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/445,865

(22) Filed: May 27, 2003

(65) Prior Publication Data

US 2005/0084215 A1 Apr. 21, 2005

(51) Int. Cl.[7] .................................................. G02B 6/38
(52) U.S. Cl. ........................................................ 385/60
(58) Field of Search ........................ 385/58, 60, 52–53, 385/70, 72, 77–78, 84, 139

(56) References Cited

U.S. PATENT DOCUMENTS

| 5,946,436 A | 8/1999 | Takashi |
| 6,287,018 B1 * | 9/2001 | Andrews et al. .............. 385/60 |

FOREIGN PATENT DOCUMENTS

| DE | 4203966 A1 | 8/1992 |
| EP | 1091226 A1 | 4/2001 |
| JP | 57 074714 | 5/1982 |

OTHER PUBLICATIONS

International Search Report for International Application No. PCT/US2004/016334 mailed on Oct. 14, 2004.

* cited by examiner

*Primary Examiner*—Javaid H. Nasri
(74) *Attorney, Agent, or Firm*—Romi N. Bose

(57) ABSTRACT

A fiber optic connector assembly includes an outer connector housing defining an optic axis. An inner optical fiber plug is mounted in the housing for limited axial movement therein and for rotational movement angularly of the axis. An indexing or locking mechanism is provided between the plug and the housing to hold the plug in selected rotational positions of adjustment angular of the optic axis. Axial movement of the plug within and relative to the housing is effective to disengage the lock or indexing mechanism and allow rotation of the plug. A retainer is selectively movable into engagement with the plug to prevent axial movement of the plug and, thereby, prevent disengagement of the lock or indexing mechanism, thereby fixing the rotational position of the adjustment of the plug.

16 Claims, 5 Drawing Sheets

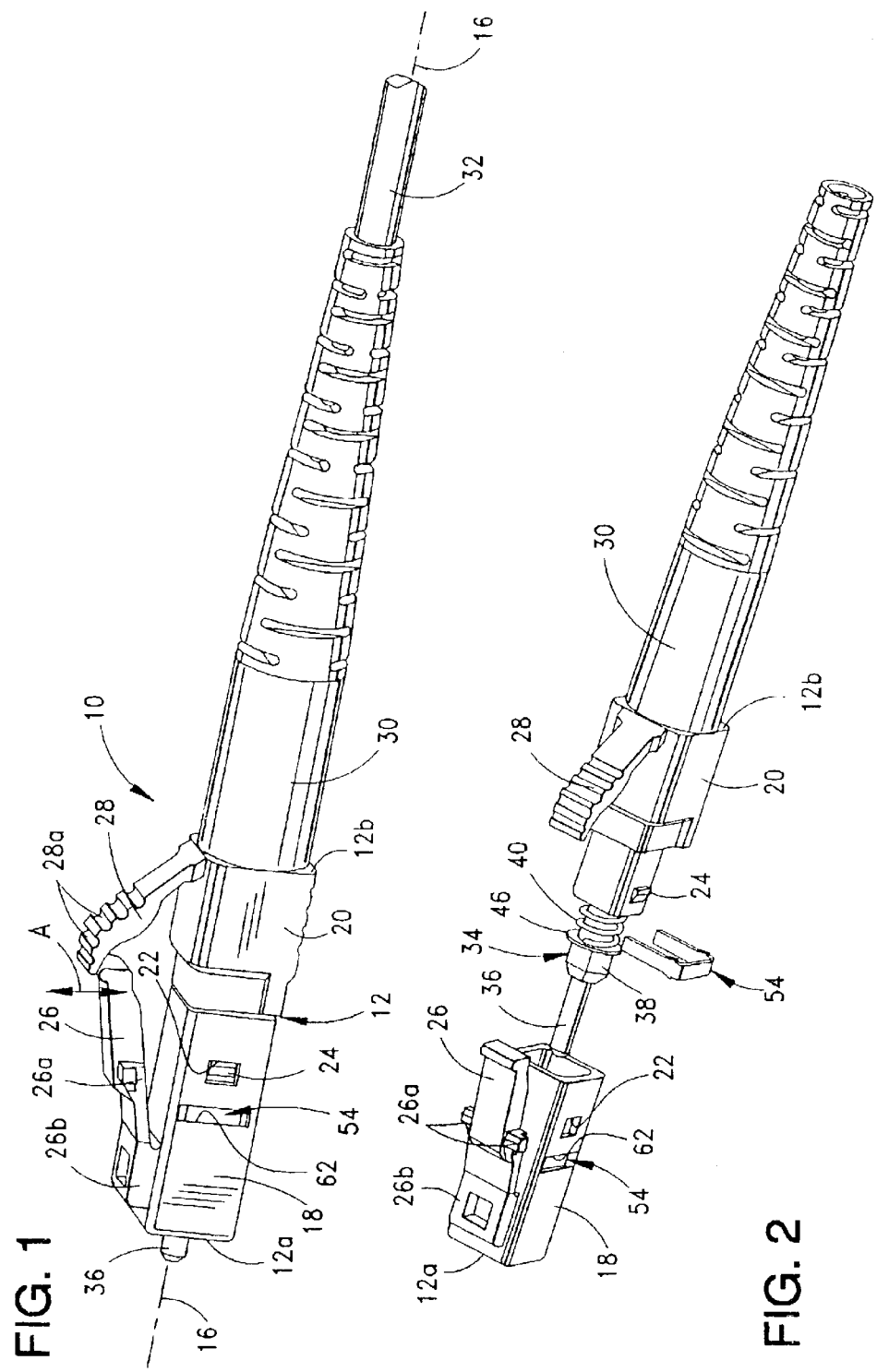

ROTATIONALLY ADJUSTABLE FIBER OPTIC CONNECTOR

FIELD OF THE INVENTION

This invention generally relates to the art of fiber optic connectors and, particularly, to a connector wherein an optical fiber is angularly adjustable about its axis and is maintainable in a selected rotational position of adjustment.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring typically is disposed within the housing or ferrule holder such that the ferrule is yieldably biased forwardly for engaging another fiber-mounting ferrule of a mating connector device. Some fiber optic connectors allow for angular adjustment of the optical fiber within the connector to achieve an optimum angular position of the fiber whereat the insertion losses of the connector are at a minimum. For instance, indexing means may be provided within the connector to define and hold the fiber-terminating ferrule in any one of a plurality of rotational positions. During or after assembly, the ferrule is rotated from one position to another sequentially, with the insertion losses measured at each position. When the optimum position is determined, the ferrule is assembled in the optimum position of adjustment, and the connector is ready for mating with a complementary connector or other fiber transmission device. In other connectors, the optimum angular position or orientation is achieved by polishing the end face of the ferrule and the optical fiber terminated therewithin.

A problem continues to be encountered with adjustable fiber optic connectors as described above. Specifically, after termination of the fiber within the connector, and after the optimum angular position of the fiber-terminating ferrule is determined, or the end face of the ferrule and fiber are polished, the ferrule and fiber often are accidentally rotated away from the optimum angular position thereof, as described above. This typically occurs because of the spring loading of the ferrule or ferrule holder, whereby the ferrule can he accidentally pushed inwardly against the spring forces and accidentally rotated out of or away from the optimum rotational position of adjustment. The present invention is directed to a system which prevents this type of accidental change in the angular position of the optical fiber within the fiber optic connector.

SUMMARY OF THE INVENTION

An object, therefore, of the invention is to provide a new and improved fiber optic connector of the character described.

In the exemplary embodiment of the invention, a fiber optic connector assembly includes an outer connector housing defining an optic axis. An inner optical fiber plug terminates an optical fiber and is mounted in the housing for limited axial movement therein, and for rotational movement angularly of the axis. Complementary interengaging lock means are provided between the plug and the housing to hold the plug in selected rotational positions of adjustment angularly of the axis. Axial movement of the plug within and relative to the housing is effective to disengage the lock means and allow rotation of the plug. Retaining means are selectively movable into engagement with the plug to prevent axial movement of the plug and, thereby, prevent disengagement of the lock means, thereby fixing the rotational position of adjustment of the plug.

As disclosed herein, the lock means between the plug and the housing is provided by a complementary interengaging rotary indexing means which includes an orthogonal socket in a through passage of the housing for receiving a complementary orthogonal plug portion of the optical fiber plug. The retaining means is engageable with the plug to prevent disengagement of the rotary indexing means.

According to an aspect of the invention, spring means are provided for normally biasing the plug forwardly to engage the rotary indexing means but allow the plug to be Oselectively moved rearwardly to disengage the rotary indexing means and, thereby, allow rotational adjustment of the optical fiber plug. The spring means is provided by a coil spring encircling the plug and engaging a radially projecting flange on the plug to normally bias the plug forwardly. The retaining means is provided by a retainer clip selectively engagement behind the radially projecting flange to prevent disengagement of the rotary indexing means. The housing includes an opening for insertion of the retainer clip from exteriorly of the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a fiber optic connector assembly embodying the concepts of the invention;

FIG. 2 is an exploded perspective view of the connector assembly;

DETAILED DESCRIPTION OF THE PREFERRED EMBODIMENTS

Figure 3:
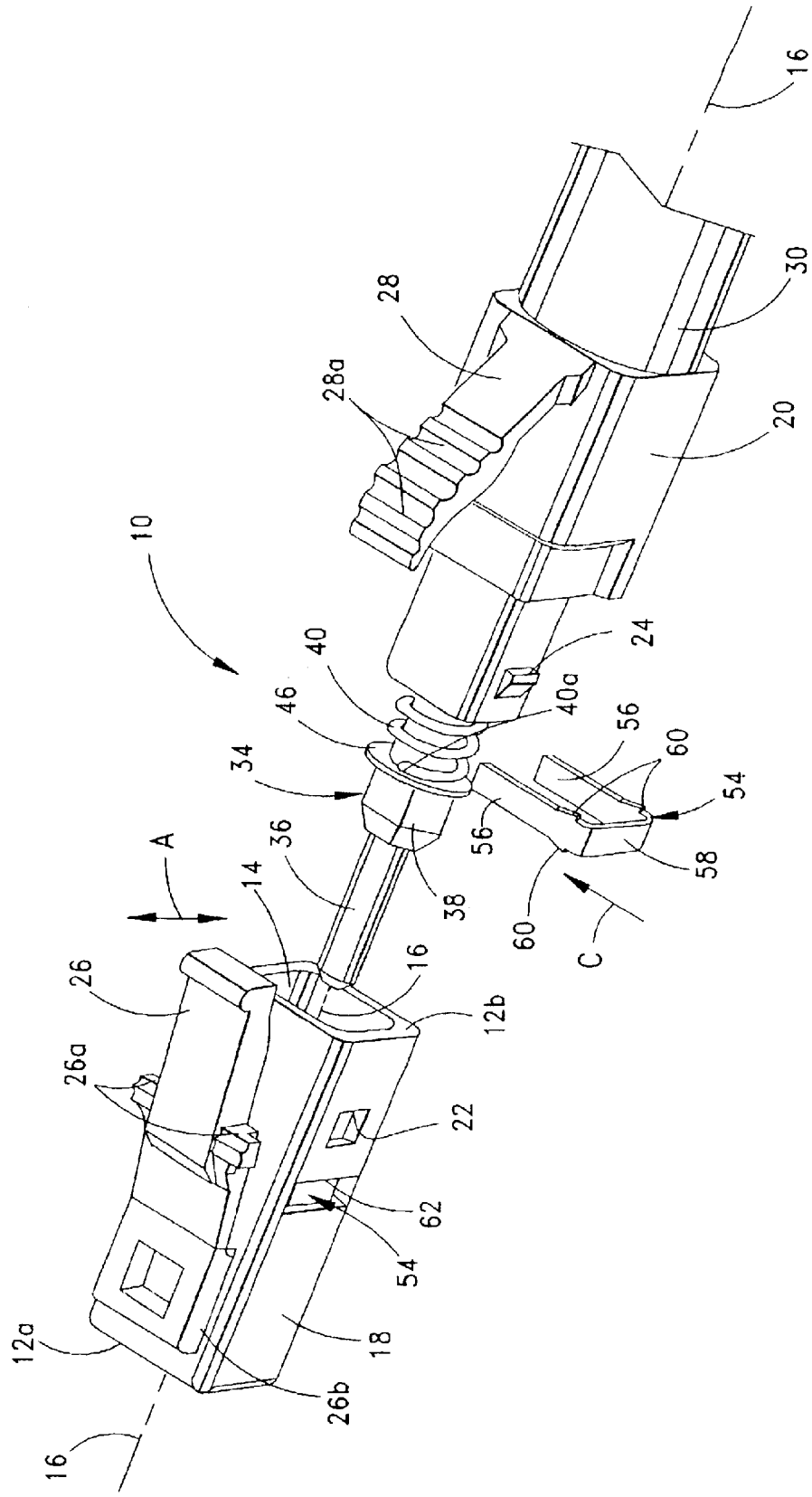
FIG. 3 is an enlarged, fragmented perspective view similar to that of FIG. 2.

Referring to the drawings in greater detail, and first to FIGS. 1–3, the invention is embodied in a fiber optic connector assembly, generally designated 10, which includes an outer connector housing, generally designated 12, having a front mating end 12a, a rear end 12b and a through passage 14 extending between the ends and defining an optic axis 16. Housing 12 is a two-part housing which includes a front housing part 18 and a rear housing part 20. The front housing part has a pair of latch openings 22 in opposite sides thereof for receiving a pair of chamfered latch bosses 24 on opposite sides of rear housing part 20 when the housing parts are assembled as seen in FIG. 1. Typically, the housing parts are molded of plastic material whereby latch bosses 24 snap automatically into latch openings 22 when the housing parts are assembled. The front housing part also has a latch arm 26 which is flexible in the direction of double-headed arrows "A". The latch arm has a pair of latching ears 26a on opposite sides thereof for latching engagement with appropriate latch means on a complementary mating connector, a mating adapter or other mating optical transmission device. Rear housing part 20 has a flexible actuator arm 28 having a serrated top surface 28a, for engagement by an operator, such as an operator's thumb, for depressing latch arm 26 downwardly toward the connector assembly. Pressing down on actuator arm 28 depresses flexible latch arm 26 which is effective to unlatch latching ears 26a from appropriate latch means on the mating connector, thereby allowing unmating of the connectors. Finally, a strain relief boot 30 projects rearwardly of the rear housing part to provide strain relief for a fiber optic cable 32.

An inner optical fiber plug, generally designated 34 (FIGS. 2 and 3), is provided for terminating at least one optical fiber of fiber optic cable 32. The plug is disposed in through passage 14 in housing 12 as is seen best in FIG. 5. The plug is disposed in the through passage for limited axial movement therein, as will be apparent hereinafter, the limited axial movement being on optic axis 16.

Figure 5:
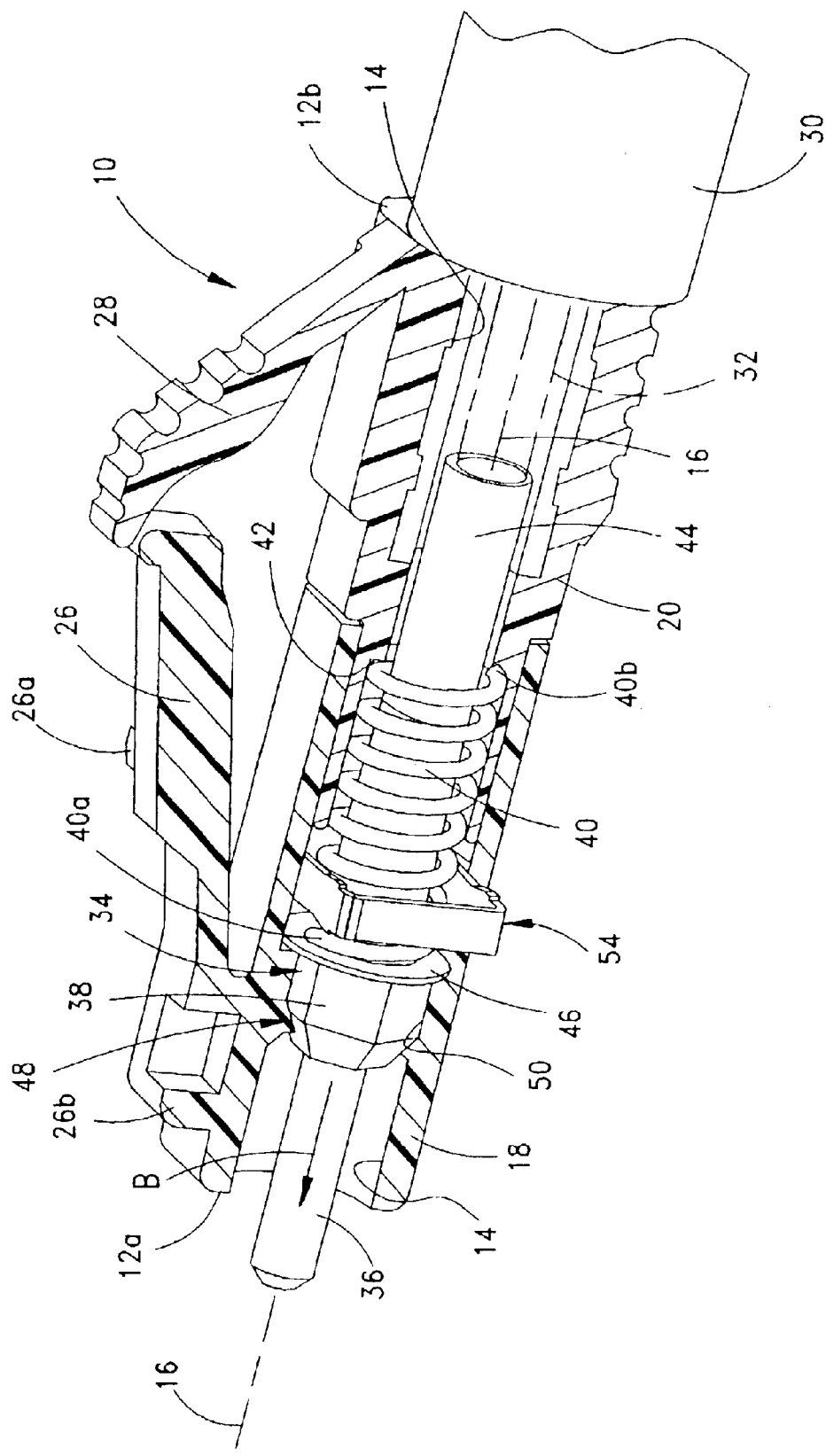
FIG. 5 is a vertical, axial section through the connector assembly in assembled condition.

Optical fiber plug includes a ferrule 36 which mounts and centers the optical fiber of fiber optic cable 32, on optic axis 16. The ferrule may be fabricated of such material as ceramic. A ferrule holder 38 embraces the ferrule and may be fabricated of such material as molded plastic. A coil spring 40 surrounds a rear tubular portion 44 of the optical fiber plug. The rear tubular portion may be integral with ferrule holder 38. The ferrule holder is larger in diameter than the rear tubular portion, and a washer-like member 46 abuts against a rear face of the ferrule holder. In assembly of fiber optic connector assembly 10, and as best seen in FIG. 5, a rear end 40b of coil spring 40 abuts against a shoulder 42 circumferentially about through passage 14 in rear housing part 20. Therefore, the coil spring is compressed between shoulder 42 and the radially projecting flange provided by washer 46. This is effective to bias optical fiber plug 34, including ferrule 36, ferrule holder 38 and rear tubular portion 44, forwardly of the connector assembly in the direction of arrow "B" (FIG. 5).

Generally, complementary interengaging rotary indexing means, generally designated 48 (FIG. 5), is provided between optical fiber plug 34 and front housing part 18 to define and hold the plug and, thereby, the optical fiber of fiber optic cable 32, in any one of a plurality of rotational positions of adjustment angularly about optic axis 16. The rotary indexing means can be considered a complementary interengaging lock means between the plug and the housing to hold the plug in selected rotational positions of adjustment. However, it should be understood that the rotary indexing means or lock means is not limited to the specific hexagonal indexing means as described below.

Figure 4:
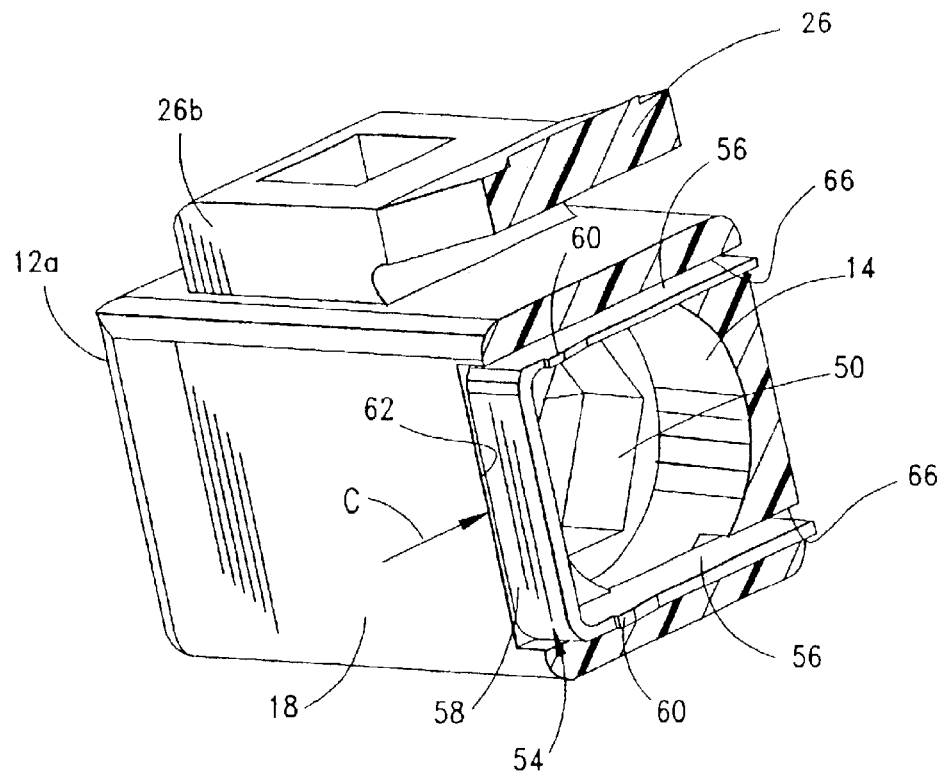
FIG. 4 is an enlarged, vertical section through the front housing part of the connector assembly.

Specifically, referring to FIG. 4 in conjunction with FIG. 5, front housing part 18 includes an orthogonal socket 50 in through passage 14. In the illustrated embodiment, the orthogonal socket is hexagonal in cross-section. As can be seen in FIG. 5, ferrule holder 32 is complementarily hexagonally configured for insertion into socket 50. Therefore, the rotary indexing means providing by hexagonal socket 50 and hexagonal ferrule holder 38, is effective to define six distinct rotational positions of adjustment of ferrule 36 and, thereby, the optical fiber angularly about optic axis 16. This allows for the connector assembly to be "tuned" in order to achieve the optimum angular orientation of the fiber.

As is know in the art, tuning is achieved by placing fiber optic connector assembly 10 in a measuring apparatus which simulates a complementary mating connector. The insertion losses of the connector assembly (i.e., the optical losses of the optical fiber) arc measured in a given rotary position of optic fiber plug 34. The plug then is pushed axially inwardly (i.e., opposite the direction of arrow "B") against the biasing of coil spring 40, until hexagonal ferrule holder 38 is moved out of hexagonal socket 50. The plug then is indexed or rotated to the next position afforded by the orthogonal arrangement. This can be done by an operator grasping ferrule 36, pushing the ferrule in and rotating the ferrule and plug to the next indexed position. Upon release of the ferrule and plug, coil spring 40 is effective to bias the plug forwardly and reengage the interengaging rotary indexing means. The insertion losses again are measured. This same operation is repeated until all six positions or angular orientations of the plug and fiber have been measured. The plug and fiber then are rotated to the position of optimum angular orientation whereat the insertion losses are at a minimum, whereby the connector assembly is ready to be mated in operation. This final or optimal position is maintained in the connector assembly relative to an overall keying system of the assembly. In other words, latch arm 26 and especially a forward mounting portion 26b of the arm, forms a vertically projecting "key" which is aligned with a similar key on the mating connector. The keys provide a reference plane against which the optimum angular position of rotation of plug 34 can be compared.

Unfortunately, tunable or adjustable fiber optic connectors such as described above have created problems because they are prone to becoming accidentally "untuned" during handling and/or mating. In other words, inner optical fiber plug 34 may be accidentally rotated to an unintended rotational position of adjustment angularly of optic axis 16. For instance, this can happen if the end of ferrule 36 is accidentally abutted against a foreign object, and the plug is pushed in and "jumps" to a different indexed position.

In order to solve the above problems, the invention contemplates a retaining means selectively movable into engagement with the plug to prevent disengagement of the rotary indexing means and, thereby, fix the rotational position of adjustment of the plug. This is effective to fix the angular position of the optical fiber relative to optic axis 16 and, thereby, ensure that the optical fiber is in its optimal position of minimal insertion losses.

In the exemplary embodiment, the retaining means is provided by a retainer clip, generally designated 54. The retainer clip is generally U-shaped to define a pair of legs 56 joined by a cross portion 58. A pair of teeth 60 project outwardly from opposite sides of each leg 56. Front housing part 18 is provided with an opening 62 into which retainer clip 54 is inserted in the direction of arrows "C" (FIGS. 3 and 4).

After optical fiber plug 34 is rotated to its optimum position of adjustment angularly of optic axis 16, as described above, retaining clip 54 it inserted through opening 62 in front housing part 18 so the retainer clip is spaced behind washer 46 as seen in FIG. 5. This allows for limited axial movement of optical fiber plug 34 without hexagonal fiber holder 38 moving completely out of hexagonal socket 50. In other words, spring loading of the plug is desirable, if not necessary, such that ferrule 36 is yieldably biased forwardly for engaging another fiber-mounting ferrule of a mating connecting device. Yet, retainer clip 54 prevents disengagement of the hexagonal rotary indexing means.

Figure 7:
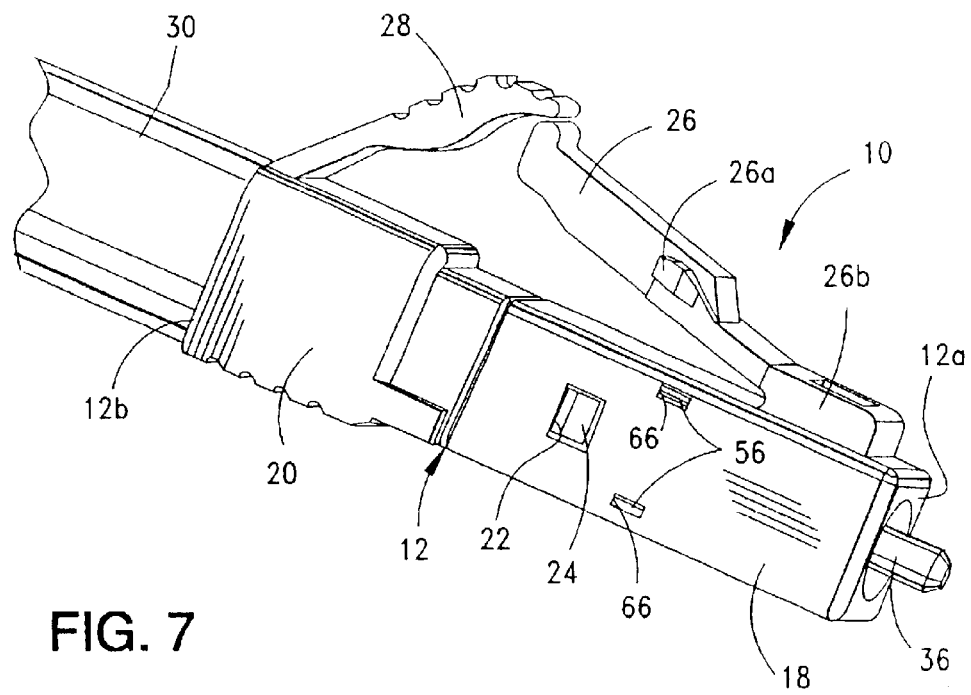
FIG. 7 is a perspective view looking at the opposite side of the connector assembly from that shown in FIG. 1.
Figure 6:
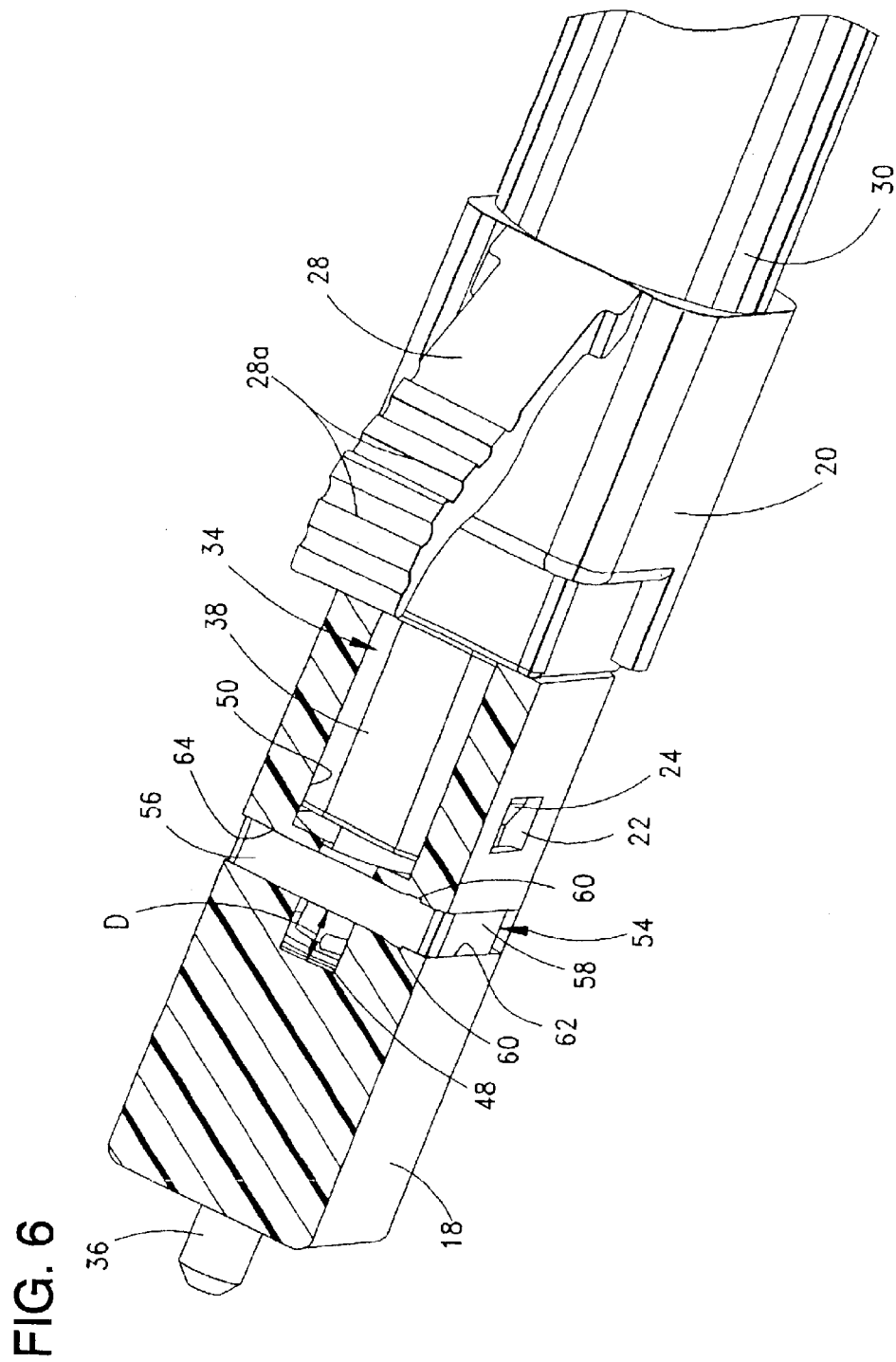
FIG. 6 is a to perspective view of the connector assembly in assembled condition, with a horizontal section through the front housing part to show the grooves for receiving the retaining clip.

FIG. 6 shows that legs 56 of retainer clip 54 are inserted into grooves 64 in front housing part 18. Teeth 60 at opposite edges of the legs bight into the plastic material of the front housing part at opposite sides of grooves 64 to hold the retainer clip in its inserted position. Double-headed arrow "D" in FIG. 6 shows the axial distance that optical fiber plug 34 can yield against coil spring 40 without disengaging the hexagonal rotary indexing means. FIG. 7 shows that front housing part 18 includes a pair of small openings 66 for receiving the distal ends of legs 56 of the retainer clip when the retainer clip is fully inserted into the housing.

Although the invention is described herein primarily for use with an optical fiber plug which terminates a normal optical fiber, the invention has applicability for use with other types of fibers. For instance, a polarization maintaining (PM) fiber could he terminated and must be maintained in a given angular orientation within the connector assembly.

It will he understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector assembly, comprising:
   an outer connector housing having a front mating end, a rear end and a through passage extending between the ends and defining an optic axis;
   an inner optical fiber plug for terminating at least one optical fiber of a fiber optic cable, the plug being disposed in the through passage in the housing for limited axial movement therein, with a front ferrule portion of the plug terminating the optical fiber at the front mating end of the housing, and with the fiber optic cable extending from the rear end of the housing, the inner optical plug further including at least one latch boss;
   complementary interengaging rotary indexing means between the plug and the housing to hold the plug and, thereby, the optical fiber in any one of a plurality of rotational positions of adjustment angularly of said axis, said complementary interengaging rotary indexing means including at least one latch opening formed in said housing for receiving said at least one latch boss;
   spring means for normally biasing the plug forwardly to engage the rotary indexing means but allowing the plug to be selectively moved rearwardly to disengage the rotary indexing means and, thereby, allow rotational adjustment of the plug; and
   retaining means selectively movable into engagement with the plug to prevent disengagement of the rotary indexing means from said housing.

2. The fiber optic connector assembly of claim 1 wherein said spring means comprises a coil spring encircling the plug and engageable with a radially projecting flange to normally bias the plug forwardly to engage the rotary indexing means.

3. The fiber optic connector assembly of claim 2 wherein said retaining means comprises a retainer clip selectively engageable behind said radially projecting flange to prevent disengagement of the rotary indexing means.

4. The fiber optic connector assembly of claim 3 wherein said housing includes an opening for insertion therethrough of the retainer clip from exteriorly of the housing.

5. The fiber optic connector assembly of claim 1 wherein said complementary interengaging rotary indexing means comprise a hexagonal socket in the through passage of the housing for receiving a complementary orthogonal plug portion of the optical fiber plug.

6. The fiber optic connector assembly of claim 1 wherein said retaining means comprises a retainer clip selectively engageable with the plug to prevent disengagement of the rotary indexing means.

7. The fiber optic connector assembly of claim 6 wherein said housing includes an opening for insertion therethrough of the retainer clip from exteriorly of the housing.

8. A fiber optic connector assembly, comprising:
   an outer connector housing defining an optic axis;
   an inner optical fiber plug mounted in the housing for limited axial movement therein and for rotational movement angularly of said axis;
   complementary interengaging lock means between the plug and the housing to hold the plug in selected rotational positions of adjustment angularly of said axis, with axial movement of the plug within and relative to the housing being effective to disengage the lock means and allow rotation of the plug; and
   retaining means selectively movable into engagement with the plug to prevent said axial movement of the plug and, thereby, prevent disengagement of the lock means, thereby fixing the rotational position of adjustment of the plug.

9. The fiber optic connector assembly of claim 8 wherein said retaining means comprises a retainer clip selectively engageable with the plug to prevent disengagement of the lock means.

10. The fiber optic connector assembly of claim 9 wherein said housing includes an opening for insertion therethrough of the retainer clip from exteriorly of the housing.

11. The fiber optic connector assembly of claim 8 wherein said retaining means is positioned to allow for limited axial movement of the inner optical fiber plug but insufficient axial movement of the plug which would disengage the lock means.

12. The fiber optic connector assembly of claim 11, including spring means for normally biasing the plug in a forward direction to engage the interengaging lock means.

13. A method of adjusting the rotational position of an optical fiber angularly of an optic axis in a fiber optic connector assembly, comprising the steps of:
   providing an outer connector housing defining the optic axis;
   positioning an inner optical fiber plug within the housing, with the plug having limited axial movement in the housing as well as rotational movement angularly of said axis;
   providing interengageable lock means between the plug and the housing to hold the plug in selected rotational positions of adjustment angularly of said axis, with axial movement of the plug being effective to disengage the lock means and allow rotation of the plug;
   moving the plug axially to disengage the lock means;
   rotating the plug to adjust the rotational position of the optical fiber angularly of the optic axis;

moving the plug axially to reengage the lock means; and retaining the plug in position of engagement of the lock means to fix the rotational position of the optical fiber angularly of the optic axis and to prevent disengagement of the plug from within the housing.

14. The method of claim 13 wherein said retaining step is performed from exteriorly of the housing.

15. The method of claim 14 wherein said retaining step is carried out by using a retainer clip selectively engageable with the plug to prevent axial movement of the plug and, thereby, prevent disengagement of the lock means.

16. The method of claim 15 wherein said housing is provided with an opening, and said retaining step is carried out by inserting the retainer clip through the opening into engagement with the plug.

* * * * *